US 6,621,972 B2

(12) United States Patent
Kimerling et al.

(10) Patent No.: US 6,621,972 B2
(45) Date of Patent: Sep. 16, 2003

(54) OPTICAL WAVEGUIDES WITH TRENCH STRUCTURES

(75) Inventors: Lionel C. Kimerling, Concord, MA (US); Kazumi Wada, Lexngton, MA (US); Hermann A. Haus, Lexington, MA (US); Milov Popovic, Allston, MA (US); Shoji Akiyama, Brighton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 46 days.

(21) Appl. No.: 09/977,637

(22) Filed: Oct. 15, 2001

(65) Prior Publication Data

US 2002/0076188 A1 Jun. 20, 2002

Related U.S. Application Data

(60) Provisional application No. 60/240,282, filed on Oct. 13, 2000.

(51) Int. Cl.[7] ................................................. G02B 6/10
(52) U.S. Cl. ........................ 385/132; 385/129; 385/47
(58) Field of Search ................................. 385/132, 129, 385/47

(56) References Cited

U.S. PATENT DOCUMENTS 4,999,686 A * 3/1991 Autier et al. .................. 385/14

FOREIGN PATENT DOCUMENTS

| EP | 0 349 038 A | 1/1990 | |
|---|---|---|---|
| EP | 1058136 | * 12/2000 | G02B/6/12 |
| EP | 1 058 136 A | 12/2000 | |

OTHER PUBLICATIONS

"Ultrasmall waveguide bends: the corner mirrors of the future?" Spiekman et al. *IEEE Proceedings: Optoelectronics, Institution of Electrical Engineers, Stevenage.* Feb. 1995. Vol. 142, No. 1.

"Low Transition Losses in Bent Rib Waveguides," Seo et al. *IEEE Journal of Lightwave Technology.* Oct. 1996. Vol. 14, No. 10.

"Optical bent rib waveguide with reduced transition losses," Seo et al. *IEEE Transactions on Magnetics.* May 1996. Vol. 32, No. 3.

"Graded–Effective–Index Waveguiding Structures Fabricated with Laser Processing," Ruberto et al. *SPIE Proceedings.* Jan. 1990. Vol. 1215.

Yamauchi et al. "Effects of Trench Location on the Attenuation Constant in Bent Step–Index Optical Waveguides," *IEICE Trans. Electron.* vol. E77–C. No. 2. Feb. 1994.

* cited by examiner

Primary Examiner—Hemang Sanghavi
Assistant Examiner—Eric Wong
(74) Attorney, Agent, or Firm—Samuels, Gauthier & Stevens, LLP (57) ABSTRACT

Arrangements using air trench cladding enables minimization of the evanescent tail to suppress light coupling to radiation modes, resulting in low-loss bends and splitters. Structures including sharp bends and T-splitters without transmission loss, crossings without crosstalk, and couplers from/to fibers and with out-of-plane waveguides without substantial loss are provided with such air trench claddings. Air trench sidewall cladding of waveguides pushes evanescent tails toward top and bottom claddings to enhance coupling between vertically positioned waveguides. Fabrication processes using wafer bonding technology are also provided.

21 Claims, 8 Drawing Sheets

OPTICAL WAVEGUIDES WITH TRENCH STRUCTURES

PRIORITY INFORMATION

This application claims priority from provisional application Ser. No. 60/240,282 filed Oct. 13, 2000.

BACKGROUND OF THE INVENTION

1. Field of the Invention

The invention makes bends of small bending radii possible in low-index difference waveguides, and further for efficient coupling from/to fibers and between two vertically positioned waveguides. These optical interconnections enable an increased density of integration of optical components on one chip.

2. Prior Art

Waveguide bends, splitters couplers are essential components of optical circuits. The well-developed "silica bench" technology accommodates waveguide interferometric filters for multiplexing and de-multiplexing and other optical components. The refractive index contrast between the waveguide cores and claddings is small, leading to waveguide cross-sections that are relatively large and index matched so as to permit coupling from and to optical fibers with low insertion loss. This is one of the reasons for the wide application of the technology. However, the density of integration of optical components is limited by the fact that, with waveguides formed via small index contrast, bends must possess relatively large bending radii to keep the radiation losses within acceptable bounds.

The index difference $\Delta n$ between the core and cladding is predominantly controlled by impurity doping such as Ge, B, etc., in silica bench technology. Thus, $\Delta n$ is typically controlled to be 0.01 or less, resulting in bends with a curvature on the order of mm. Since a 90° splitter of the waveguide consists of two bends, the structure requires as large curvature as bends. Thus, silica bench integrated optical circuits possess around 10×10cm² in area.

It is obvious that increase of $\Delta n$ in the bench should lower the curvature of bends and splitters. It is, however, difficult to find cladding materials with refractive indices lower than silica, since the refractive index of silica core is as low as ~1.5. Thus, the silica technology stays in low-density circuitry on a relatively large bench.

In addition to above reasons, even if one adopts high index contrast system in integrated optical circuits, the mode size difference between optical fiber and integrated optical circuits becomes large and Fresnel reflection at the interface between optical fiber and integrated optical circuits brings about huge junction loss.

In order to increase the difference of refractive index between the core and cladding, use of air cladding is effective. Regarding air cladding, U.S. Pat. No. 3,712,705 issued to Marcatili et al. shows it in case of optical fibers. The air-clad optical fiber is described as including a low-loss dielectric core, having a polygonal cross section disposed within a circular jacket. Because of its shape, the core is, in effect, totally surrounded by air, which makes $\Delta n$ larger.

SUMMARY OF THE INVENTION

In the invention, waveguide bends having two or more sidewalls interfaced with air trench claddings are provided. The invention uses the principles of index guidance, adiabatic transition, and mode matching to counter Fresnel reflection induced junction loss.

It is an objective of the invention to provide a bend and a splitter of a waveguide with a relatively small curvature, and to provide a coupler from/to fiber and between out-of plane waveguides. It is another objective of the invention to provide a fabrication method for these structures. Wafer bonding allows us to incorporate air as the low-index material.

The invention addresses waveguide bends and crossings of waveguides of low index contrast using local air-trenches at the bends and crossings which increase the index difference locally to ~0.5 or larger, depending upon the core index. In the invention, air is chosen as the low index material as an example, but other materials including low-index polymers and insulators can also be used instead of air for the trenches.

DETAILED DESCRIPTION OF THE INVENTION

Figure 1:
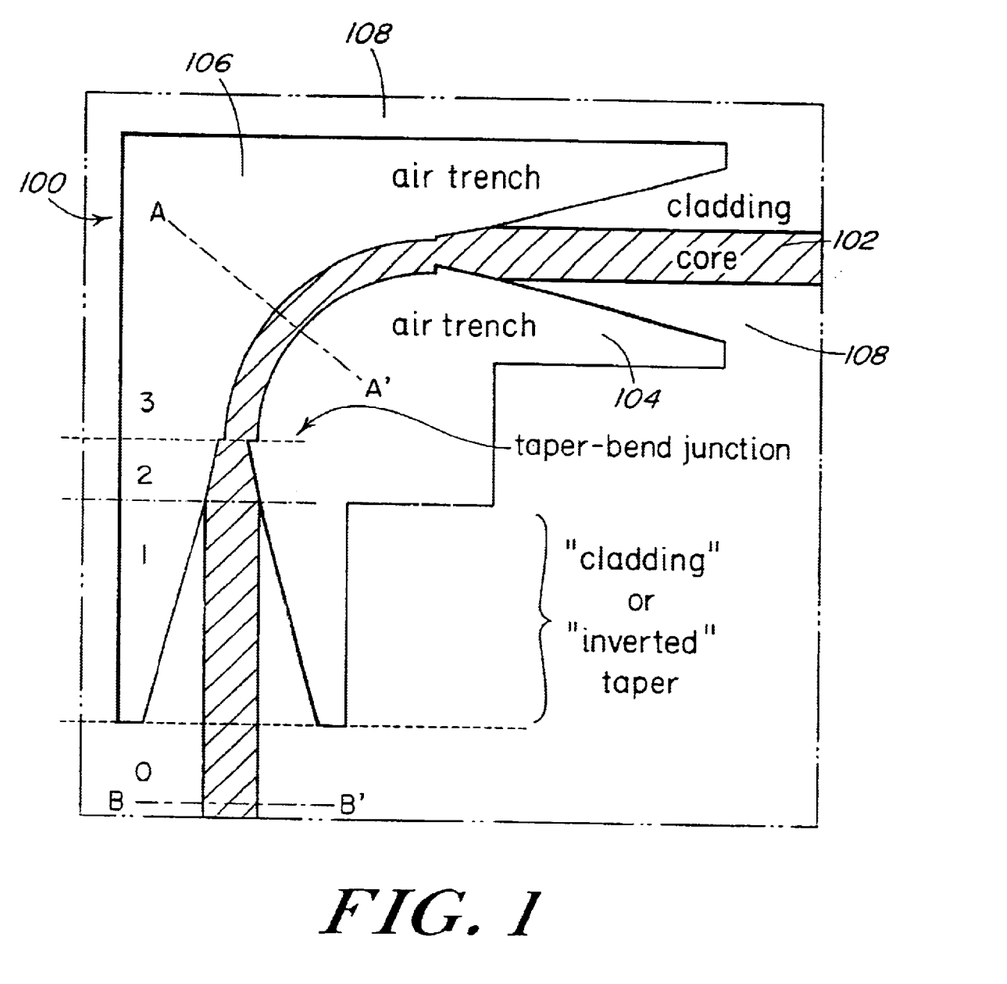
FIG. 1 is a top-view schematic of a waveguide bend arrangement in accordance with the invention.

FIG. 1 is a top view of a schematic block diagram of a waveguide bend arrangement 100 in accordance with the invention. The waveguide bend is defined by a core region 102, first 104 and second 106 air trench regions, and a surrounding cladding region 108. The air trench waveguide bend performance is optimized by proper selection of the taper length, the bend radius, and the width and offset of the bent waveguide. The width of the bent waveguide and its lateral offset from the (straight) taper output are shown in FIG. 1 and are chosen so as to optimally match the light at the output of the taper to the lowest order leaky mode of the bend.

With proper design dimensions, with or without an offset at the bend, simulations show proposed air trench bends with a transmission efficiency of >98% (<0.1 dB loss per corner bend). For index contrasts of 7% and 0.7% (D=$\Delta n/n$), the simulations show a size reduction (in comparison to a regular waveguide bend in the same index contrast) by a factor of 4 and 30 in length, respectively; this corresponds to 16 to 900 times reduction by area. Extrapolating to lower, fiber-like index contrasts approaching 0.25%, bends more compact by a factor of as much as 50 min edge length, or 2500 in area, are predicted.

The bend includes three sections, i.e., waveguide sections (1), (2), and (3). Waveguide sections (0) and (3) are singlemoded. Although waveguide sections(l) and (2) are multi-moded at steady state, they preserve a quasi-single mode as a transient mode within such a short distance. Transmission loss due to mode mismatch is negligible.

The index of the core region remains unchanged across the entire arrangement.

Waveguide sections (1) includes the core and surrounding cladding whose index difference is 0.05. Waveguide sections (2) and (3) are respectively tapered and bent, both utilizing the air trench regions as the mechanisms for containing light therein and reducing the radiation loss.

Figure 2A:
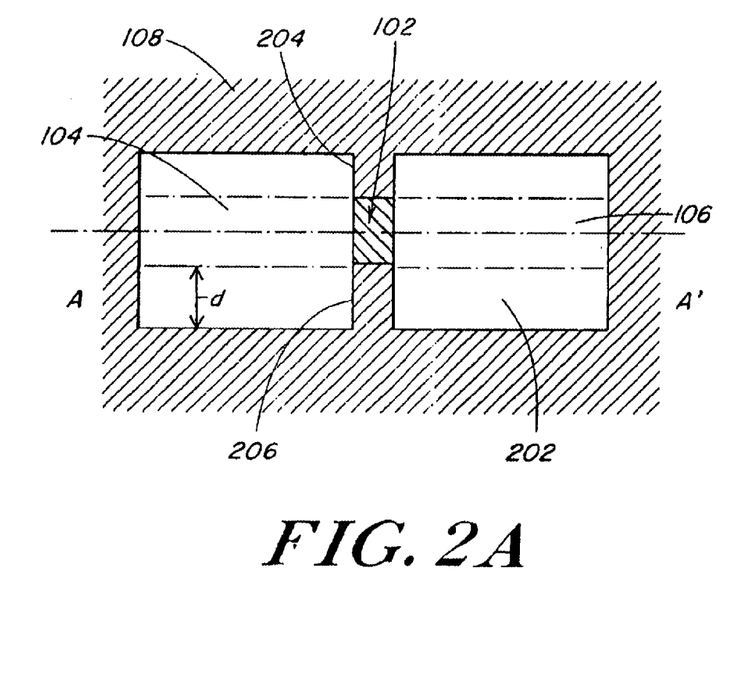
FIG. 2A is a cross sectional view of the waveguide bend arrangement taken along line A–A' of FIG. 1.

FIG. 2A is a cross sectional view of the waveguide bend arrangement 100 taken along line A–A' of FIG. 1. The structure includes the core 102 virtually surrounded by the first 104 and second 106 air trench regions that include upper 200 and lower 202 trenches. The core 102 is supported by first 204 and second 206 extensions of the cladding 108. In this configuration, the core is virtually suspended within an air cladding. Since the configuration defines a local high index difference within the bend by the "air wall" formed by the air trench regions, the evanescent tails of propagating modes extending from the sidewalls are minimized. The trenches 200, 202 are configured such that their depth d is greater than the evanescent tail length. Accordingly, light cannot significantly couple to radiation modes at the bend. Although long evanescent tails into the upper and lower cladding exist, they also cannot couple to radiation modes because of the air trench regions 104, 106 (i.e. their upper and lower extensions, such as regions 200, 202).

Figure 2B:
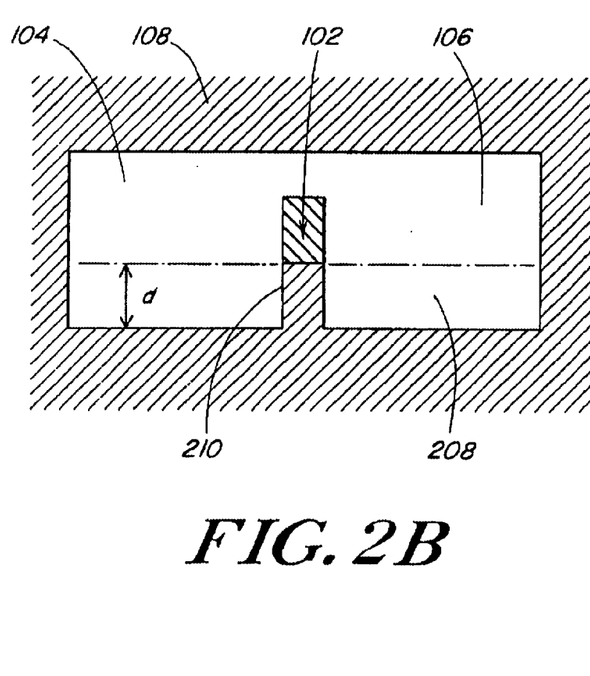
FIG. 2B is a cross sectional view of an alternative embodiment of the waveguide bend arrangement taken along line A–A' of FIG. 1.

FIG. 2B is a cross sectional view of an alternative embodiment of the waveguide bend arrangement 100 taken along line A–A' of FIG. 1. The structure includes the core 102 virtually surrounded by the first 104 and second 106 air trench regions that include lower 208 trenches.

The core 102 is supported by only an extension 210 of the cladding 108. Again, in this configuration, the core is virtually suspended within an air cladding. Thus, the core has an air cladding on its top surface as well as the two sidewalls. Although a long evanescent tail of the field extends into the lower cladding, the coupling to radiation modes is suppressed again by the lower air trench (208).

Figure 3:
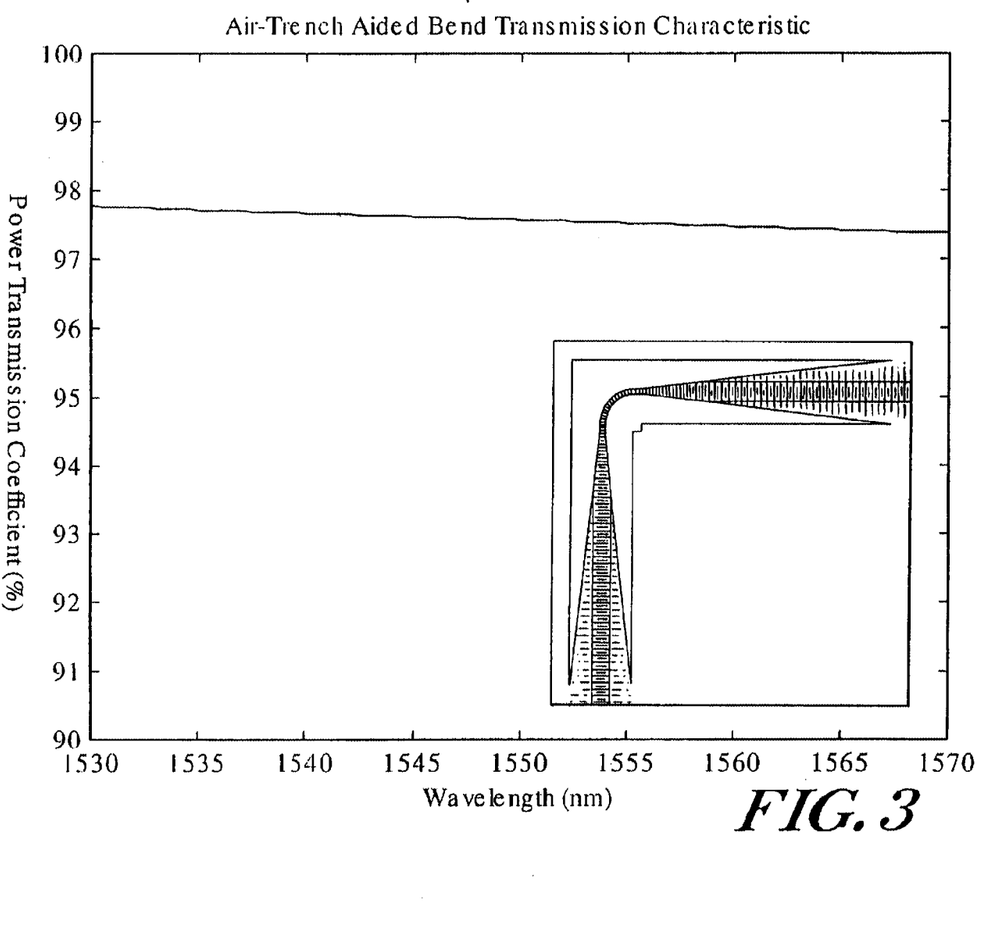
FIG. 3 is a graph showing simulation results of a waveguide bend.

The transmittance of a light wave from one end of the waveguide to the other is around 97% or higher, as predicted by simulation results shown in the graph of FIG. 3. The mode shaping is shown as an inset. Here, it is assumed 1.5 as the core index and 1.45 as the cladding index (Δn=0.05), while Δn is increased to 0.5 at the air trenches. However, the proposed principle is effective in reducing bend size for 0.001<Δn/n<0.1.

Figure 4:
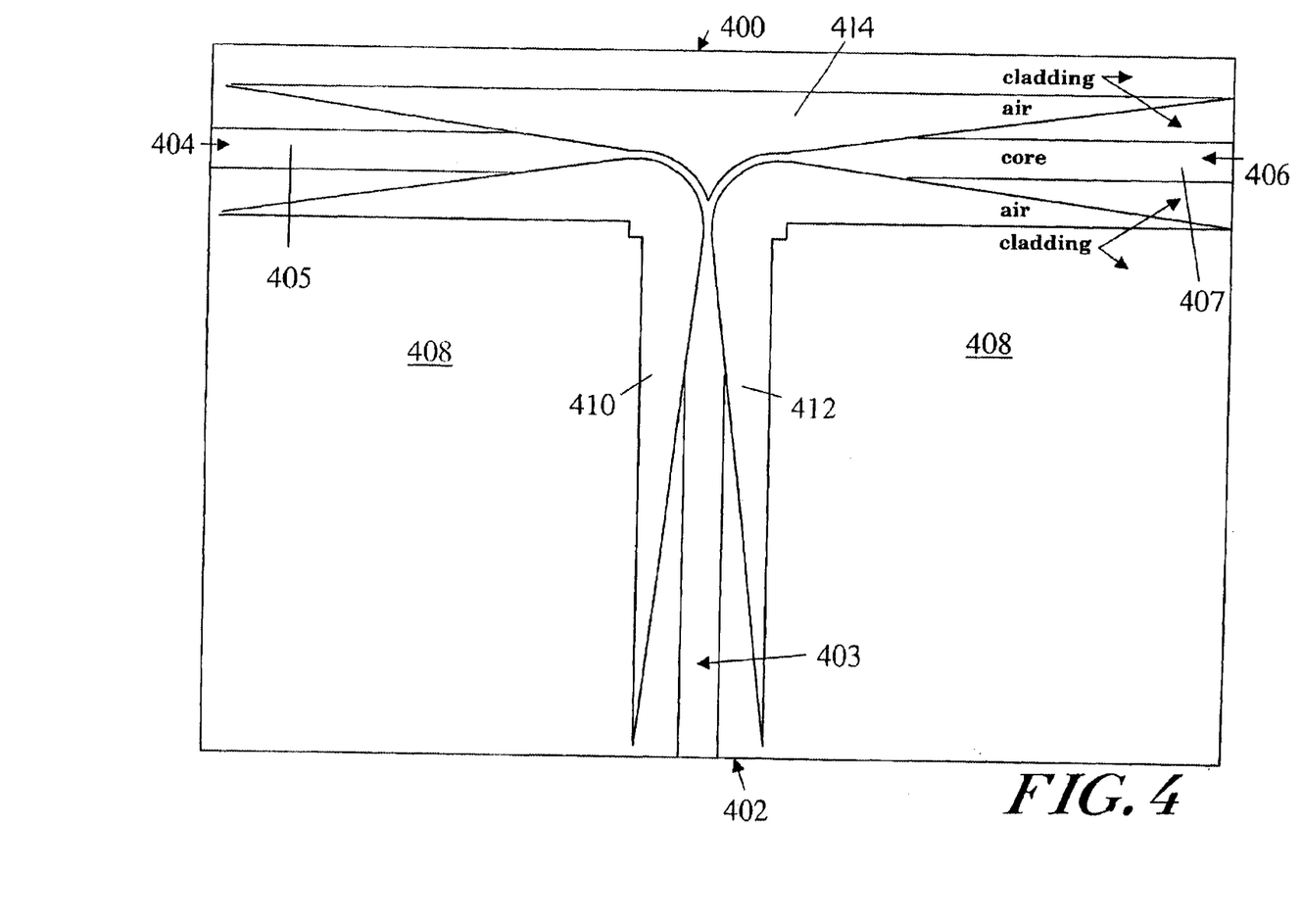
FIG. 4 is a top-view schematic of a T-splitter arrangement 500 in accordance with the invention.

Waveguide T-splitters can also be configured following either of the two principles described thus far. The tapered waveguide and air trench regions of FIG. 1 can be modified to have two outputs as shown in FIG. 4. FIG. 4 is a top view of a schematic block diagram of a T-splitter arrangement 400 in accordance with the invention. The T-splitter includes three waveguides 402, 404, 406. Each of the waveguides includes respective core regions 403, 405, 407, which are surrounded by a cladding 408. The T-splitter arrangement 400 also includes air trench regions 410, 412, 414 in the waveguides.

The light in the incoming waveguide 402 is split into the two waveguides 404, 406 by a small T-splitter section three gradual tapers. The radii of the bends can be made small with the air cladding provided by the air trench regions. In this manner, T-splitters can be realized of smaller dimensions than currently available.

Since the invention involves waveguide tapering under a gradual increase of the effective Δn, the taper alone works as a coupler of an optical fiber to a waveguide. Its primary success is elimination of the junction loss between the low and high index contrast (Δn) regions. The coupler is clearly bi-directional, as evidenced by the high transmission efficiency achieved in the bends, as shown in FIG. 3.

The air trench regions serve to suppress horizontally extending evanescent tails in the sidewall direction by virtue of the increased index difference. The mode squeezing present in the structures simultaneously extends the mode's vertical tail in the out-of-plane direction. This converts the cross-sectional shape of the mode from a circle to an ellipse. Thus, vertical coupling is enhanced in out-of-plane multi-layer waveguides.

Figure 5A:
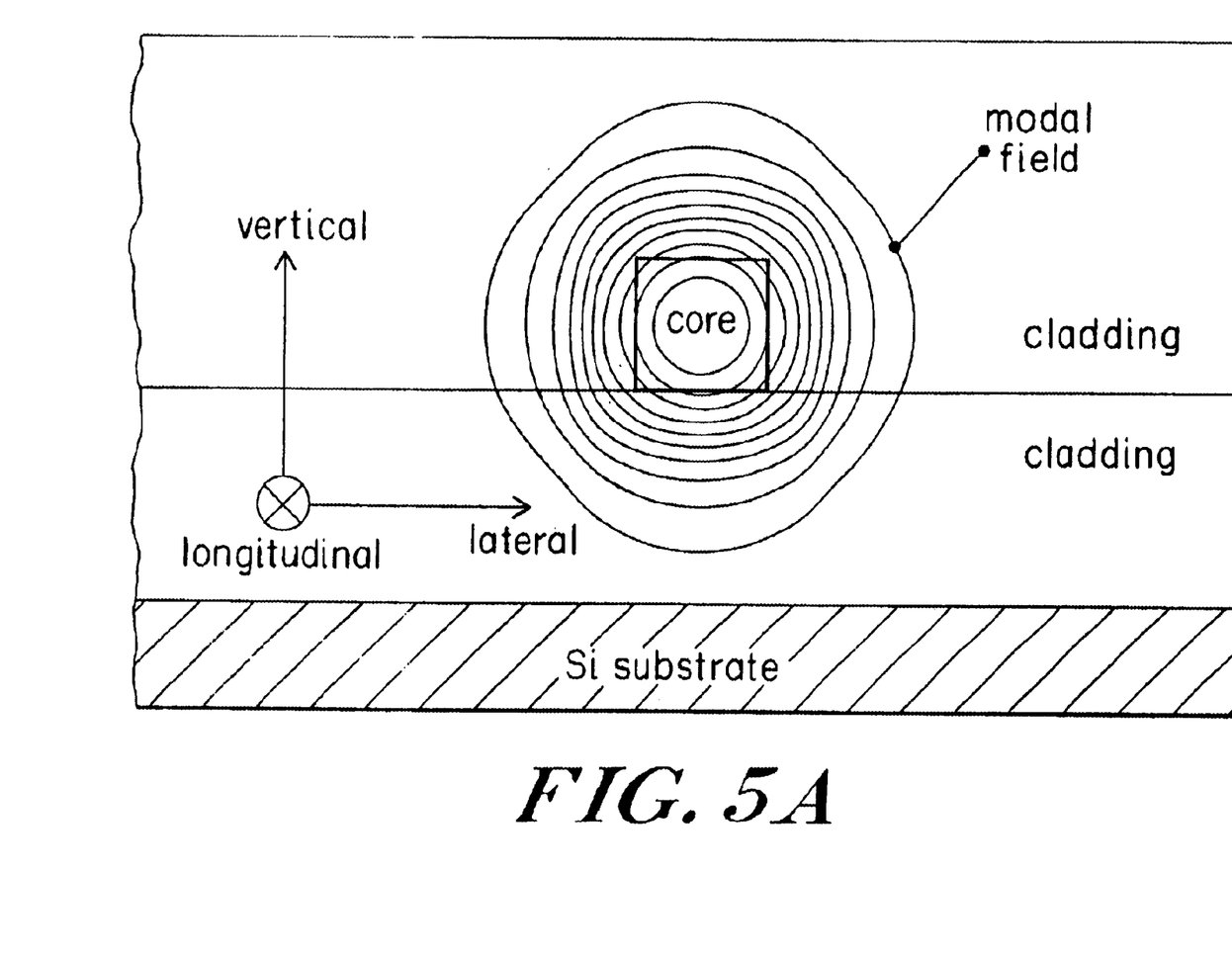
FIGS. 5A and 5B show the simulation results of the mode without and with the air trench structure of the invention, respectively.
Figure 5B:
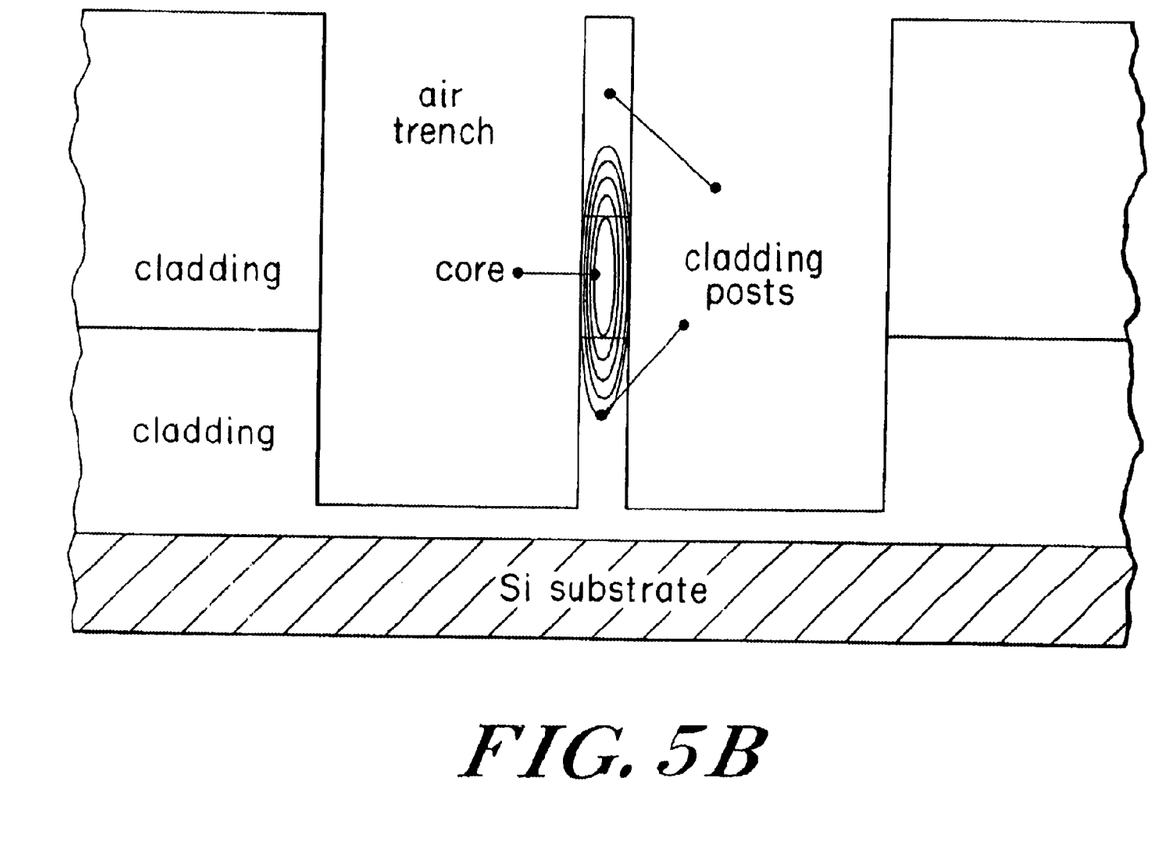

For purposes of a vertical (inter-plane) coupler, FIGS. 5A and 5B show the simulation results of the mode without or with air trench sidewalls, respectively. FIG. 5A shows the mode without the air trench as circular-shaped. However, in arrangements with the air trench, the mode becomes an ellipse with long evanescent tails only toward the top and bottom claddings, as shown in FIG. 5B. This illustrates that out-of-plane coupling becomes more efficient.

Figure 6A:
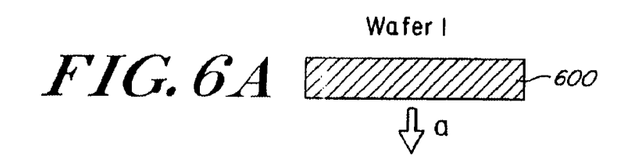
FIGS. 6A–6G are schematic diagrams showing a process flow of the fabrication of the air trench structure shown in FIG. 2A.
Figure 6B:
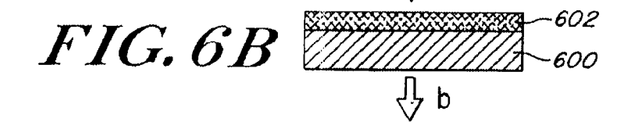
Figure 6C:
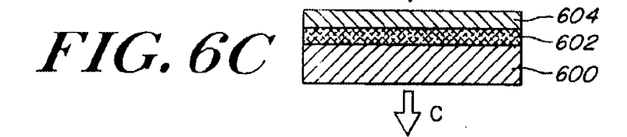
Figure 6D:
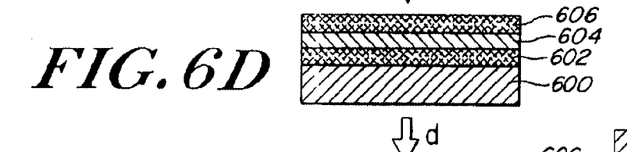
Figure 6E:
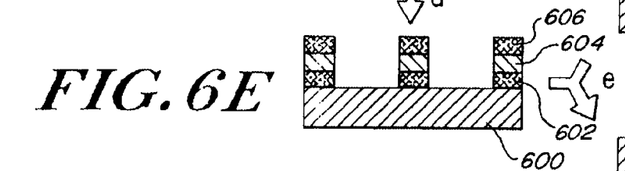
Figure 6F:
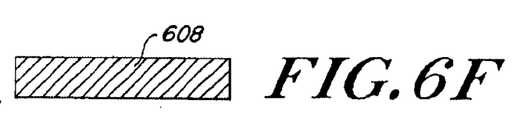
Figure 6G:
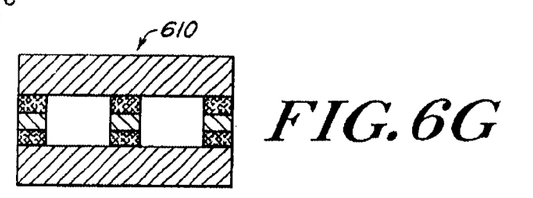

FIGS. 6A–6G are schematic diagrams showing a process flow of the fabrication of the air trench structure shown in FIG. 2A. A $SiO_2$ layer 602 is formed on a Si wafer 600 by a conventional process (a) (FIGS. 6A–6B). The process (a) can be thermal oxidation, CVD (chemical vapor deposition), flame hydrolysis, etc. The $SiO_2$ layer 602 is used as the lower cladding. The layer 602 can be B-doped $SiO_2$, P-doped $SiO_2$, etc. Then, a waveguide core material 604 is formed on the $SiO_2$ layer 602 by a conventional process (b) (FIG. 6C). The material 604 can be Ge doped $SiO_2$ whose index is higher by the chosen Δn (e.g. 0.01) than the layer 602. On the layer 604 is formed another $SiO_2$ layer 606 by a conventional process (c) (FIG. 6D). The layer 606 is the upper cladding and can be the same as layer 602. The waveguide and trenches are fabricated using a conventional photolithography process. Then, the structure is etched by a conventional process (d) (FIG. 6E). The wafer 600 and another wafer 608 (FIG. 6F) (bare silicon wafer) are finally bonded to form the air-trench structure 610 as shown in FIG. 2A.

The processes and materials described are only one of the examples to fabricate the structure, and thus the invention is not limited by the above-mentioned method. For example, the materials of layers 602, 604 and 606 can be formed by implantation of impurities, B, P, and Ge. A low index difference between core and cladding ~0.01 is also achievable by a $Si_3N_4$ core and $Si_xN_yO_z$ by choosing composition. In addition, it can be achieved by using a $Si_x'N_y'O_z'$ core and $Si_xN_yO_z$ by choosing composition. An air trench structure for a SiNO core has an even larger index difference, at most 1.0, although 0.5 is the largest index difference in a $SiO_2$ core with the use of an air trench.

Figure 7A:
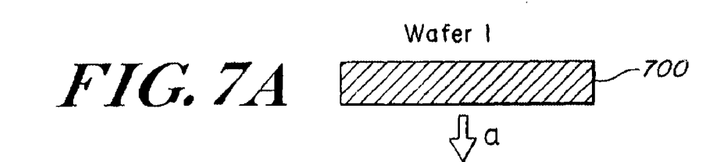
FIGS. 7A–7H are schematic diagrams showing a process flow of the fabrication of an air trench structure shown in FIG. 2B.
Figure 7B:
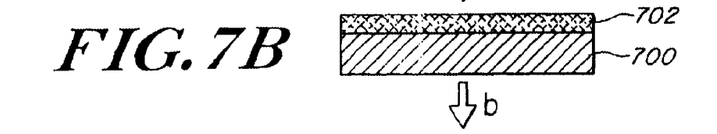
Figure 7C:
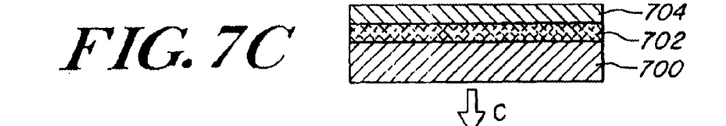
Figure 7D:
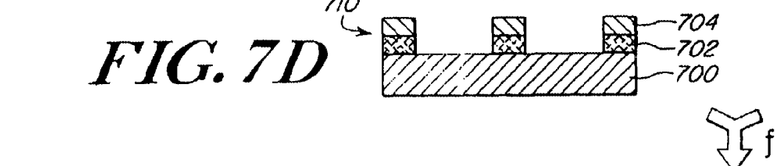
Figure 7E:
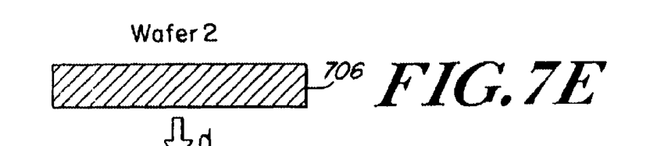
Figure 7F:
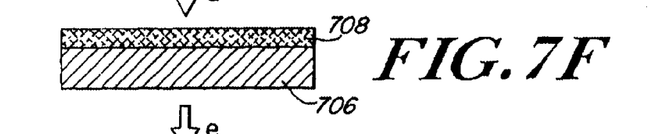
Figure 7G:
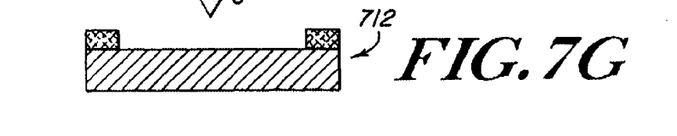
Figure 7H:
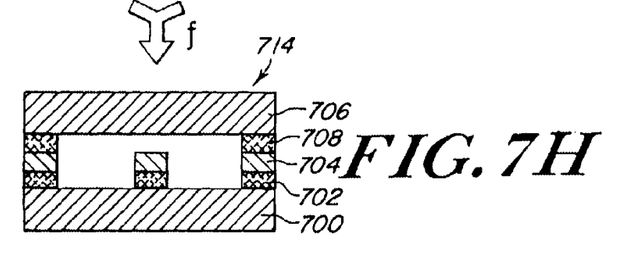

FIGS. 7A–7H are schematic diagrams showing a process flow of the fabrication of an air trench structure shown in FIG. 2B. By conventional processes (a) and (b), a structure with a waveguide layer 704 and a lower cladding layer 702 is formed on the wafer 700 (FIGS. 7A–7C). By a conventional process (d), an upper cladding layer 708 is formed on a wafer 706 (FIGS. 7E–7F). After photolithography, waveguide and trench structures 710 and 712 are fabricated by conventional processes (c) and (e) (FIGS. 7D and 7G). The structures 710 and 712 are finally bonded to form an air trench structure 714 as shown in FIG. 2B.

In summary, structures in FIGS. 1 and 4 exemplify index guiding and adiabatic mode shaping, this avoiding the penalty of junction loss. Light traveling from an inlet waveguide is shaped into another waveguide where the sidewall cladding is air. Thus, the traveling wave hardly couples to a radiation mode because of a short evanescent tail. After the light passes the bends, the waveguide configuration restores to the original cladding and the light is recaptured in the fundamental mode of the output waveguide. The T-splitters operate in terms of the same principle.

In the illustrated embodiments of invention, air is chosen as a low index material as an example, but other materials including low-index polymers and insulators can also be used instead of air for the trenches.

Although the present invention has been shown and described with respect to several preferred embodiments thereof, various changes, omissions and additions to the form and detail thereof, may be made therein, without departing from the spirit and scope of the invention.

What is claimed is:

1. A waveguide arrangement comprising:
   a core region having first and second sidewalls that extend from a bottom surface to a top surface;
   first and second trench regions adjacent said core region that extend longitudinally along said first and second sidewalls, respectively, and extend vertically above and below said top and bottom surfaces a predetermined depth, said depth being greater than the evanescent tail length of light propagating in said core; and
   a cladding region that surrounds said core region and trench regions.

2. The arrangement of claim 1, wherein the difference in indices of refraction is greater between said core region and said trench regions than that of said core region and said cladding region.

3. The arrangement of claim 1, wherein said trench regions comprise a low index material.

4. The arrangement of claim 3, wherein said low index material comprises air.

5. The arrangement of claim 1, wherein said core region is supported between said trench regions with a support extension from said cladding region to said bottom surface of said core region.

6. The arrangement of claim 5, wherein said core region is further supported between said trench regions with a support extension from said cladding region to said top surface of said core region.

7. The arrangement of claim 5, wherein said trench regions are continuous adjacent said top surface of said core region.

8. The arrangement of claim 1 implemented as a waveguide bend.

9. The arrangement of claim 1 implemented as a waveguide T-splitter.

10. The arrangement of claim 1 implemented as a fiber coupler.

11. A waveguide arrangement comprising:
    a first section having a core region with a width $w_1$ that has first and second sidewalls and top and bottom surfaces, and a cladding region surrounding said core region;
    a second section in which said core region tapers from the width $w_1$ to a width $w_2$, and first and second trench regions adjacent said core region extend longitudinally along said first and second sidewalls, respectively, and extend vertically above and below said top and bottom surfaces a predetermined depth, said depth being greater than the evanescent tail length of light propagating in said core, said cladding region surrounding said core region and said trench regions; and
    a third section including said core region of width $W_2$, said first and second trench regions adjacent said core region, and said cladding region surrounding said core region and said trench regions.

12. The arrangement of claim 11, wherein the difference in indices of refraction is greater between said core region and said trench regions than that of said core region and said cladding region.

13. The arrangement of claim 11, wherein said trench regions comprise a low index material.

14. The arrangement of claim 13, wherein said low index material comprises air.

15. The arrangement of claim 11, wherein said core region is supported between said trench regions with a support extension from said cladding region to said bottom surface of said core region.

16. The arrangement of claim 15, wherein said core region is further supported between said trench regions with a support extension from said cladding region to said top surface of said core region.

17. The arrangement of claim 15, wherein said trench regions are continuous adjacent said top surface of said core region.

18. The arrangement of claim 11 implemented as a waveguide bend.

19. The arrangement of claim 11 implemented as a waveguide T-splitter.

20. The arrangement of claim 11 implemented as a fiber coupler.

21. The arrangement of claim 11, wherein in said first section said cladding region adjacent said sidewalls of said core region is surrounded by said trench regions and tapers inwardly so as to provide a gradual increase in index difference to said core region.

* * * * *